(12) United States Patent
Debruijn et al.

(10) Patent No.: US 7,836,953 B2
(45) Date of Patent: Nov. 23, 2010

(54) CARBONACEOUS EXTENDERS FOR FLEXIBLE CEMENT

(75) Inventors: Gunnar Debruijn, Calgary (CA); Robert Williams, Houston, TX (US); Emmanuel Therond, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/098,873

(22) Filed: Apr. 7, 2008

(65) Prior Publication Data

US 2009/0250219 A1  Oct. 8, 2009

(51) Int. Cl.
*E21B 33/13* (2006.01)
*C04B 24/36* (2006.01)

(52) U.S. Cl. .................. 166/293; 106/668; 106/716
(58) Field of Classification Search .................. None
See application file for complete search history.

(56) References Cited

U.S. PATENT DOCUMENTS

| 3,376,146 | A |   | 4/1968 | Mitchell | |
|---|---|---|---|---|---|
| 4,043,828 | A | * | 8/1977 | Gaines | 106/668 |
| 4,957,555 | A | * | 9/1990 | Wheeler et al. | 106/716 |
| 2008/0196628 | A1 | * | 8/2008 | Santra et al. | 106/705 |

OTHER PUBLICATIONS

Stiles D. and Hollies D.: "Implementation of Advanced Cementing Techniques to Improve Zonal Isolation in Steam Assisted Gravity Drainage Wells", SPE/CIM Canadian Heavy Oil Association (CHOA) 78950 presented at the Heavy Oil Symposium and International Well Technology Conference, Calgary, Alberta, Canada (Nov. 4-7, 2002).

* cited by examiner

*Primary Examiner*—Zakiya W. Bates
(74) *Attorney, Agent, or Firm*—David Cate; Robin Nava; Jeff Griffin (57) ABSTRACT

A flexible cement stable at high temperatures contains an extender that is a finely ground bituminous coal and/or a finely ground coke prepared from coal and/or liquid hydrocarbons. Preferred cokes are made from bituminous coals and from petroleum, heavy oil, and oil from tar sands, oil shales or oil sands. The coke is present in an amount up to 100 percent by weight of cement and the particle size is preferably from 1 to 1000 microns. The coke is also effective as an extender, and the slurries and set cements have low specific gravity.

16 Claims, 5 Drawing Sheets

CARBONACEOUS EXTENDERS FOR FLEXIBLE CEMENT

BACKGROUND OF THE INVENTION

Primary cementing in a cased oil, gas, or water well is the process of placing cement in the annulus between the casing and the formations through which the wellbore passes. The major objective is to provide zonal isolation, which is the prevention of fluid flow between different formation layers. Various materials may be added to the cement to enhance the performance and/or to improve the economics. Recent development of heavy oil reserves using heat (for example using steam) have placed additional stresses on the cement sheath, which may compromise the zonal isolation achieved with existing cement slurries.

Current cement composites that contain extenders that also provide set cement flexibility are not stable at the high temperatures at which steam is used in some heavy oil recovery wells. Extenders that can provide flexibility after extended exposure to high-pressure steam would be desirable.

SUMMARY OF THE INVENTION

One embodiment of the Invention is a cement including an additive selected from either finely ground coke, finely ground coal, or a mixture of the two. A preferred coal for the finely divided coal is bituminous coal. The coke may be derived from coal, for example bituminous coal, but is preferably derived from a hydrocarbon liquid, such as petroleum, heavy oil, oil from tar sands, oil from oil shale, and oil from oil sands. The coke is preferably prepared by continuous fluid bed coking or delayed coking. A preferred delayed coke is sponge coke. The additive is preferably present in a particle size range of from about 1 to about 1000 microns, more preferably in a particle size range of from about 40 to about 400 microns, and most preferably in a particle size range of from about 100 to about 200 microns. The additive may be calcined or uncalcined. The additive is preferably present in an amount up to about 100 percent by weight of cement, more preferably in an amount of from about 20 to about 100 percent by weight of cement. The cement typically includes one or more than one of at least a fluid loss additive and a retarder.

Another embodiment of the Invention is a method of cementing a cased well penetrating a subterranean formation, involving preparing a cement including an additive selected from finely ground coke, finely ground coal, or mixtures of the two, and injecting the cement into the annulus between the casing and the formation. The well may subsequently be cooled to temperatures as low as −10° C., and/or subjected to temperatures up to about 340° C.

Yet another embodiment of the Invention is a method of squeeze cementing a well penetrating a subterranean formation, involving preparing a cement including an additive selected from finely ground coke, finely ground coal, or mixtures of the two, and injecting the cement into the well at a high enough pressure to force the cement into a subterranean void.

DETAILED DESCRIPTION OF THE INVENTION

The Invention may be described in terms of treatment of vertical wells, but is equally applicable to wells of any orientation. The Invention may be described for hydrocarbon production wells, but it is to be understood that the Invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Extenders increase the volume of a cement slurry, and decrease the density of the slurry and of the set cement. Many extenders are currently used in oil well cementing, including pozzalan ash, fly ash, and powdered coal. Some extenders that also impart flexibility to the cement include a variety of proprietary polymeric additives, foam, and lightweight hollow spherical additives. There are many disadvantages to current technologies for cement extenders, including, but not limited to, increased cement cost, limited extender availability, and (for many) reduced set cement flexibility. The reduced flexibility is especially problematic at typical steam injection temperatures (above about 644° F. (340° C.)), and known extenders that impart flexibility at low temperatures may not be suitable at steam injection temperatures.

U.S. Pat. No. 4,043,828 disclosed that "Carbonaceous materials have been added to cement compositions for very limited specific purposes in the oil well cementing environment. Thus, U.S. Pat. No. 2,609,882 discloses adding activated carbon to a cement composition for cementing oil wells in order to offset the deleterious effects, on the cement, of the oil well drilling mud additives. U.S. Pat. No. 3,376,146 discloses the addition of large amounts, at least 20 percent by weight or more, of carbon including ground lignite coal, bituminous coal, anthracite coal, graphite, petroleum coke and coke to a cement composition for cementing oil wells in order to provide a low-density composition. Neither of the aforementioned patents dealing with oil well cementing recognizes any advantage or disadvantage of the added carbon material other than that described." U.S. Pat. No. 4,043,828 then taught that, to avoid the shrinkage of hydraulic cement mixtures caused by the addition of carbonaceous materials during setting and hardening, various particulate carbonaceous materials may be used, if they are first heated to from about 900 to 1500° F. (about 482 to 816° C.).

U.S. Pat. No. 4,957,555 describes the use of shot coke, in a broad particle size range of from 8 to 200 mesh (74 to 2380 microns) as an extender to form low density cements. That patent specifies that the cement is for use in oil and gas wells at temperatures up to about 200° F. (93° C.).

We have found that certain carbonaceous materials may be used as extenders to impart long-lasting flexibility to cements for use at high temperatures. Although coke is widely used in the cement manufacturing industry as a fuel in the clinker binding stage, it has not previously been explored as a major component in cement composites. We have found that coke-based cement composites may be used, provided that the coke is properly chosen and of the proper size, in many well cementing applications in which the cement must be flexible for long periods at high temperatures, and are particularly useful in heavy oil development, in which wells and their cement sheaths are routinely exposed to temperatures above 550° F. (288° C.). Regular KOLITE™ (commercially available flakes of low-mineral-content bituminous coal) has long been used as a lost circulation material in cement composites, although the particle sizes used have been fairly large and the particles have been in flake form. We have now found that coal, for example bituminous coal, for example in the form of KOLITE™, may be resized (ground) for use as an extender or flexible additive for cement composites, and that, like coke, fine coal, for example fine bituminous coal, may be very useful for heavy oil development where a cement sheath is exposed to temperatures up to 644° F. (340° C.).

Two types of finely ground carbonaceous materials are suitable, cokes formed from certain coals, and certain oil-derived cokes. (Cokes are made by heating carbonaceous precursors in the absence of oxygen, and contain little or no volatile material.) The cokes should not have either very high porosity (like activated carbons), nor very low porosity (like shot cokes and needle cokes). The preferred coal-derived cokes are made from bituminous coals, although cokes sourced from brown coal (lignite), sub-bituminous, semi-bituminous, and anthracite coals are suitable. The preferred oil-derived cokes are made by treatment of petroleum, heavy oil, or oil from tar sands, oil sands, or oil shales by the continuous fluidized bed process. Cokes made from these precursors by delayed coking are also suitable, especially green sponge coke. Calcined oil-derived cokes are less preferred.

Examples of two suitable cokes are shown in Table 2. Coke I was made by fluid coking; the Coke II is believed to have been made by delayed coking. These cokes were made from the tar sands of Northern Alberta, Canada.

| Property | Coke I | Coke II |
|---|---|---|
| As received ("Proximate") % | | |
| Moisture | 1.6 | 6.2 |
| Volatile matter | — | 10.1 |
| Ash | 7.1 | 2.5 |
| Dry ("Ultimate") % | | |
| C | 79.9 | 85.1 |
| H | 1.9 | 3.9 |
| S, N, O | 11.1 | 8.3 |
| Ash | 7.1 | 2.7 |
| Hardgrove Index | 15-20 | 38 |
| Heating Value (BTU/kg) | 28,000 | 32,250 |

-continued

| Property | Coke I | Coke II |
|---|---|---|
| Bulk Density (kg/l) | 1.07 | 0.67 |
| Cumulative Particle Size (% less than) | | |
| 40 microns | 0-3 | — |
| 100 microns | 5-19 | — |
| 200 microns | 36-62 | — |
| 4oo microns | 78-84 | — |
| 1000 microns | 86-98 | — |

In this Invention, a suitable carbonaceous material, for example either coke or fine coal, for example fine bituminous coal, is present in a cement composite in an amount not exceeding 100% BWOC (by weight of cement). The particle size range is preferably from about 1 to 1000 microns, more preferably from about 40 to 400 microns, and most preferably from about 100 to 200 microns. An example of a suitable material has less than 1% larger than 60 mesh (250 microns) and less than 10% smaller than 170 mesh (90 microns).

Any oilfield cement may be used. Preferred cements include API Class G, API Class H. cement classed as General Utility (GU) cement similar to ASTM Type 10, and High Early similar to ASTM type 30. The cement blend may also contain gypsum in addition to that added by the cement manufacturer.

Heavy Oil development using recovery methods such as cyclic steam stimulation (CSS) or steam assisted gravity drainage (SAGD) typically involves exposing the heavy oil formations to steam temperatures ranging, for example, from about 356 to about 653° F. (180 to 345° C.). In SAGD, the operator typically drills two horizontal wells, one above the other. The upper, steam injection, well heats the reservoir. As the heavy oil reservoir is heated, the oil begins to drain into the lower, producing well. Depending on well and field conditions, it either flows freely to the surface or is assisted by surface pumping equipment. Steam injection is also used in "Huff and Puff" wells, in which injection and production occur cyclically in the same well. Requirements for these wells, in terms of demands placed on the cement sheath, may be even more strenuous than SAGD. Geothermal wells are exposed to temperature cycling that may attain maximum temperatures exceeding 550° F. (288° C.). The cements made according to this Invention may also be used in place of rubber seals used at the surface, for example in SAGD, although the rubber seals may still be used in addition as a secondary barrier.

The high temperatures can cause the cement sheath in the well to fail, causing zonal isolation to be lost. The mechanical properties of the cement using fluid coke or fine coal, for example fine bituminous coal, as an extender may be tailored for use in these wells, especially those wells exposed to high temperatures and drilled through soft rock. These coke or fine coal, for example fine bituminous coal-based flexible cement composites will reduce the cement sheath failure rate, improving zonal isolation in these wells. The ability of fluidized coke or fine coal, for example fine bituminous coal, to impart flexibility to the cement composite at temperatures up to 644° F. (340° C.), coupled with the low cost and wide availability of these materials, make them ideal additives for steam injection environments.

This Invention involves the incorporation of carbon-based extenders (for example fluid coke, a byproduct of heavy oil production, and fine coal, for example fine bituminous coal, a ground and sieved bituminous coal) in cement composites.

These extenders enhance the performance and/or improve the economics of current cementing practices, and increase the flexibility of the cement (demonstrated by a lower Young's modulus). Coke and fine coal, for example fine bituminous coal, may also both be used simply as extenders for cement, without regard to the improved flexibility, because they will still reduce incidences of losses and lost circulation Cement systems that include coke and fine coal, for example fine bituminous coal, will be particularly useful in heavy oil development wells, such as those exposed to steam injection. Coke has been found to be extremely stable in liquid hydrocarbon environments in testing performed at ambient temperature. Fine coal, for example fine bituminous coal, is also expected to be stable to hydrocarbons.

Other additives that may be present in the blend include a polyvinyl chloride fluid loss additive (for example at about 0.2-0.3% BWOB (by weight of blend)), polysulfonate dispersant (for example at about 0.2-0.6% BWOB) and various other retarders (for example, lignosulfonate, short-chain purified sugars with terminal carboxylate groups, and other proprietary synthetic retarder additives). Additional work has shown that coke and fine KOLITE™ additives are compatible with multiple cement types and numerous cement additives, as well as other extenders.

This Invention provides a composition and method economically to extend all cement slurries and to provide lost circulation control, as well as to improve cement composite flexibility at steam-injection temperatures (up to about 644° F. (340° C.)), independent of cement type and over a wide range of densities. The multi-purpose functionality of coke and fine coal, for example fine bituminous coal-based cement composites provides advantages to existing cementing practices. For example, as extenders, coke and fine coal, for example fine bituminous coal, help yield more slurry for a given amount of cement. In addition, measurements have shown that coke and fine coal, for example fine bituminous coal-based composites are at least 200% more flexible than either typical extended or foam-based slurries, and can maintain this flexibility after prolonged exposure to steam injection temperatures. Significant flexibility (<500 kpsi (3447 MPa)) has been achieved at concentrations as low as 20% BWOC. This Invention is especially advantageous at temperatures above 550° F. (288° C.) because systems containing fluid coke or fine coal, for example fine bituminous coal, are significantly more flexible and less permeable than cement systems using currently available flexible additives.

In nearly all coke and fine coal, for example fine bituminous coal-based flexible cement composites, silica is added (for example at about 35-45% BWOB) to prevent strength retrogression in downhole applications where temperatures may exceed 230° F. (110° C.). Other additives, such as Hematite or Barite, may be used to optimize theological properties or density. For most formulations, Hematite or Barite will not exceed 25% BWOB. Other extenders, such as microspheres, may be used over a wide concentration range to decrease density.

Although the flexible cement of the Invention has been described in terms of its use and advantages at the high temperatures encountered for example in steam injection, it is to be understood that the flexible cement of the Invention is in fact stable and useful at lower temperatures. Typically it is used at ambient surface temperatures of about 40 to 86° F. (5 to 30° C.) and then may be heated to temperatures of 340° C. (644° F.). However, it can be placed in deepwater and permafrost at temperatures as low as about −10° C. (14° F.) and then heated. In fact, the cement of the Invention may be used in places where it will see only low temperatures, for example in deepwater or permafrost when the well will not subsequently be subjected to steam treatment. The flexible cement of the Invention may also be used for squeeze cementing operations, for example remedial cementing operations designed to force cement into voids, such as leak paths in wellbore tubulars, to repair poor primary cement jobs, to isolate perforations or to repair damaged casing or liner.

The present Invention may be further understood from the following examples:

Composition of Coke and Fine KOLITE™-Based Cement Composites

The cement used was Portland API Class G, produced by Lafarge Cement Company, Mojave, Calif., U.S.A. The major components of the blends tested included coke or fine KOLITE™ (for example at 20-55% BVOB), cement (for example at 25-35% BVOB), and silica (for example at 35-40% BWOC). The measured composition of the Class G cement was 55 wt % $3CaO.SiO_2$ (tricalcium silicate), 22-28 wt % $4CaO.Al_2O_3.Fe_2O_3$ (tetracalcium alluminoferrite), 5.0 wt % $3CaO.Al_2O_3$ (tricalcium aluminate), 2.9 wt % $SO_3$, 0.8 wt % MgO, 0.55 wt % alkalies ($Na_2O.0.66\ K_2O$), and other trace components. The coke used was Coke I, obtained from SUNCOR, Alberta, Canada. KOLITE™ was obtained in flake form from Weldril, Muskogee, Okla., U.S.A.; it typically had a specific gravity of about 1.43 and a "% volatile" (a commonly used coal parameter) of about 32%. It was ground to a particle size distribution of from a few microns to 600 microns, with a mean of about 145 microns. The particle size distribution was broad and flat between about 50 and about 500 microns, with about 5% smaller than 50 microns and less than about 2% larger than 500 microns The coke-based composite slurry density was 14.4 ppg (pounds per gallon) (1725 kg/m³) with 55% SVF (Solid Volume Fraction). Fine KOLITE™ composite cement systems were tested over a range of density from 13.4-14.6 ppg (1606 to 1749 kg/m³) at 55% SVF.

Sample Preparation

Core samples were mounted in pressure cells and placed in a high temperature oven. The excess space around the cores in each cell was packed with coarse sand and water. After preparation, each cell was sealed and the cores were heated to 644° F. (340° C.) to simulate steam-injection conditions. Due to heating-related expansion, the cell pressures reached approximately 2000 psi (13.8 MPa). The samples were exposed up to four weeks, with measurements made at two weeks and four weeks. Various measurements on the core samples were taken to show trends in the development of mechanical and physical properties.

Mechanical, Porosity, and Permeability Property Measurements

A crush strength hydraulic press with a horizontal displacement tool was used to measure mechanical properties. Before loading core samples into the compressive crush strength hydraulic press, the physical dimensions of the samples were measured. The cores used in the compressive strength (CS) and Young's modulus testing typically had a diameter of 1.5 inches (3.81 cm) and a length of 2.0 inches (5.08 cm). The compressive strength was determined by applying an axial load to a core sample at 0.06 in/sec. The Young's Modulus was determined using a two-point slope method for each sample, utilizing a mechanical property acquisition/analysis software package. The tensile strength was determined by applying the Brazilian Tensile Test Method following procedures outlined in ASTM D3967 using the core dimensions of diameter of 1.5 inches (3.81 cm)

and a length of 2.0 inches (5.08 cm). In the Brazilian Method, a load was applied along the side of the core and the tensile strength was determined using the expression:

$$TS = \frac{2F}{\pi LD} \quad (1)$$

where TS is the tensile strength, F is the maximum load applied along the length of the core, and D and L are the diameter and length of the core, respectively.

Before the porosity measurements, sample dimensions were determined with a caliper. The core dimensions used in porosity and permeability measurements were typically diameter=1.0 inch (2.54 cm), and length=1.0 inch (2.54 cm). A core saturated with water was first weighed suspended in water and then removed from water and weighed again. The core was dried in an oven at 200° F. (93° C.) for 24 hours and the dry weight suspended in water was determined. The porosity was determined using Archimedes Principle:

$$\phi = \frac{\text{Weight\_Dried\_Core\_in\_Water}}{\text{Weight\_Wet\_Core\_in\_Water}} \quad (2)$$

or the ratio of the weight of the dried core in water to the weight of the saturated core in water. The permeability was measured using a modified fluid loss cell with a specialized fitting for the core sample. Pressure was varied in order to initiate flow. The permeability was determined with Darcy's Law:

$$\gamma = 245 \frac{\mu LQ}{A \Delta P} \quad (3)$$

where γ is the permeability (millidarcies), 245 is a conversion factor, μ is the viscosity (cp), L and A are the length and area of the core, respectively (in/in²), Q is the flow rate (mL/min), and ΔP is the pressure drop (psi) thru the core.

Liquid Hydrocarbon Solubility Study

The solubility of coke-based cement composites was determined using commercially available red diesel. Two cores (1 in (2.54 cm) diameter×1 in (2.54 cm) length) were placed in 250 mL glass beakers filled with diesel and allowed to sit for one week under ambient conditions. Observations were made at regular intervals to note any marks, cracks, or other indicators of degradation. None was noted.

Example 1

Effect of Coke and Fine KOLITE™ Extenders on Increasing Cement Yield

Figure 1:
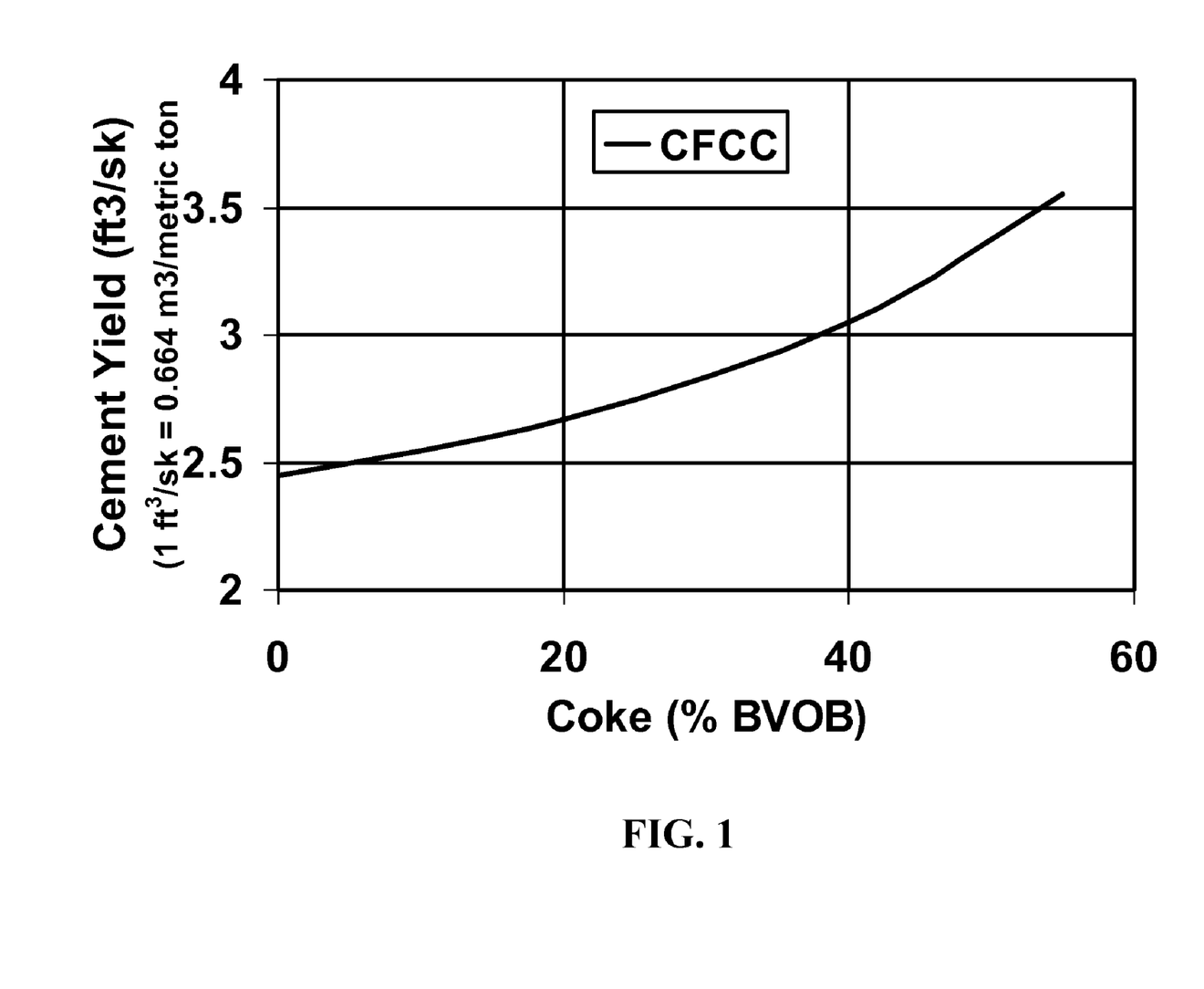
FIG. 1 shows the effect of coke concentration on cement yield for a typical low-density cement composite slurry.

A brief study examined the dependence of cement yield (ft³/sk (cubic feet per sack)) on increasing coke concentration. While maintaining a typical composite design at constant density (13.0 ppg (1558 kg/m³)), a range of coke concentrations was tested (0-55% BVOB (by volume of blend)). The results of the coke composite design study are summarized in FIG. 1. For every 5% BVOB increase in coke, the cement yield was increased by an average of 0.17 ft³/sk (0.113 m³/metric ton). The SVF increased from 27.9% to 42.8% with the increase of coke content from 0 to 55%. A similar study was performed with fine KOLITE™ at constant SVF (55%), with the fine KOLITE™ concentration increasing from 35 to 55% BVOB. For every 5% increase in fine KOLITE™, cement yield was increased by an average of 0.24 ft³/sk (0.159 m³/metric ton).

Example 2

Coke and Fine KOLITE™ Cement Composite Mechanical Properties at Elevated Temperature (644° F. (340° C.))

Young's Modulus

Figure 2:
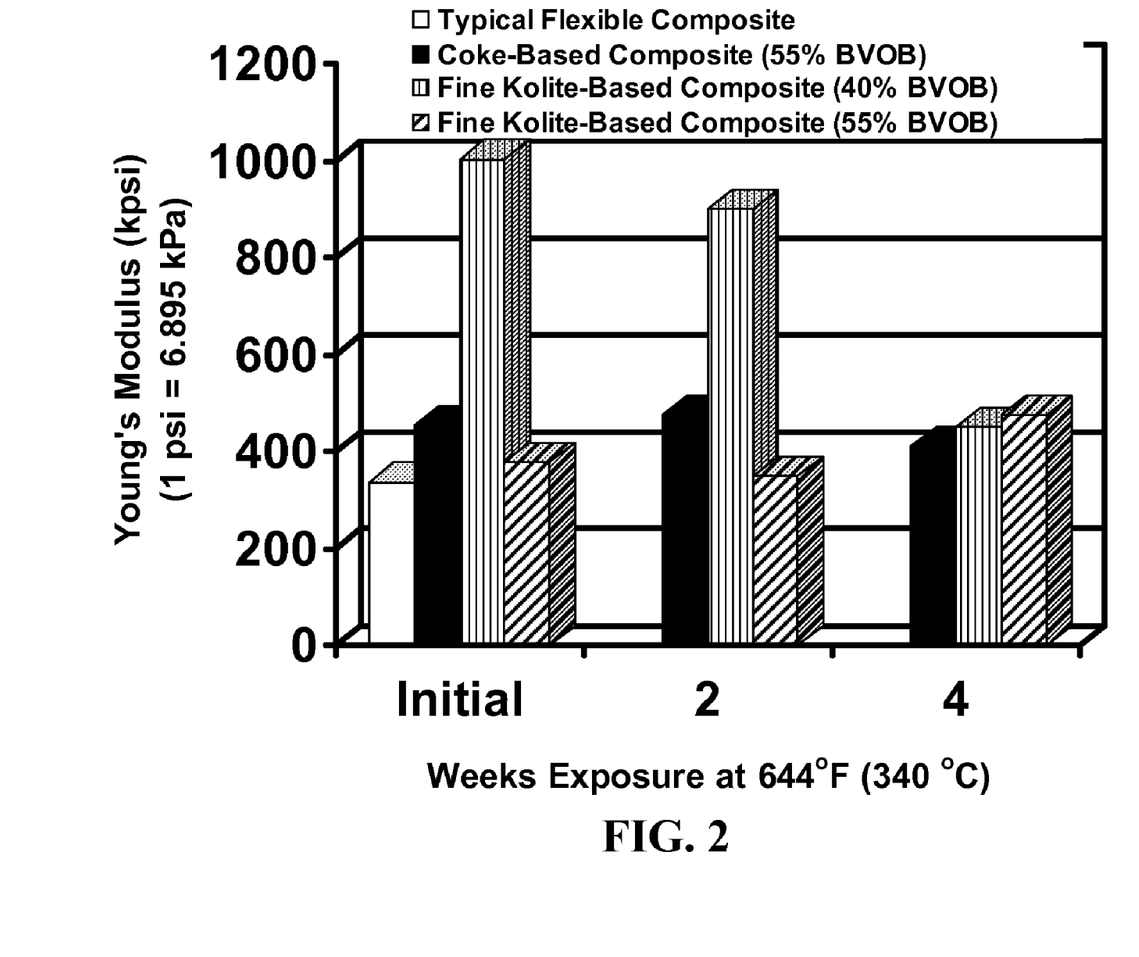
FIG. 2 shows the Young's Modulus vs. time for a typical flexible composite and for three flexible composites of the Invention.

The Young's modulus of coke and fine KOLITE™ composites of the Invention remained at acceptable levels after four weeks of curing at 644° F. (340° C.). For the coke-based composite, having a BVOB of coke of about 55%, the initial Young's modulus was 453 kpsi (3123 MPa), and after four weeks, the Young's modulus was 411 kpsi (2834 MPa). For the fine-KOLITE™-based composite with 55% BVOB, the initial Young's modulus was 378 kpsi (2606 MPa), and after four weeks the Young's modulus was 476 kpsi (3282 MPa). The initial Young's modulus for a typical flexible cement composite" of 12.9 ppg (1546 kg/m³) was 343 kpsi (2365 MPa). In a previous study it had been found that cores of the typical flexible cement composite were unsuitable for testing after a one-week exposure at 600° F. (316° C.). In that study, cores exposed to 550° F. (288° C.) had had a Young's modulus of 500 and 410 kpsi (2827 MPa) after one and two week's exposure, respectively. FIG. 2 shows some results of the present study. The initial Young's Modulus of coke-based, fine KOLITE™-based, and typical flexible materials were similar (although a fine KOLITE™ based material at one fine KOLITE™ concentration was significantly better) but coke-based and fine KOLITE™-based cements were able to maintain these flexible properties after long periods of constant exposure at temperatures exceeding the maximum stability temperature limit of typical flexible cement composites.

Compressive Strength

Figure 3:
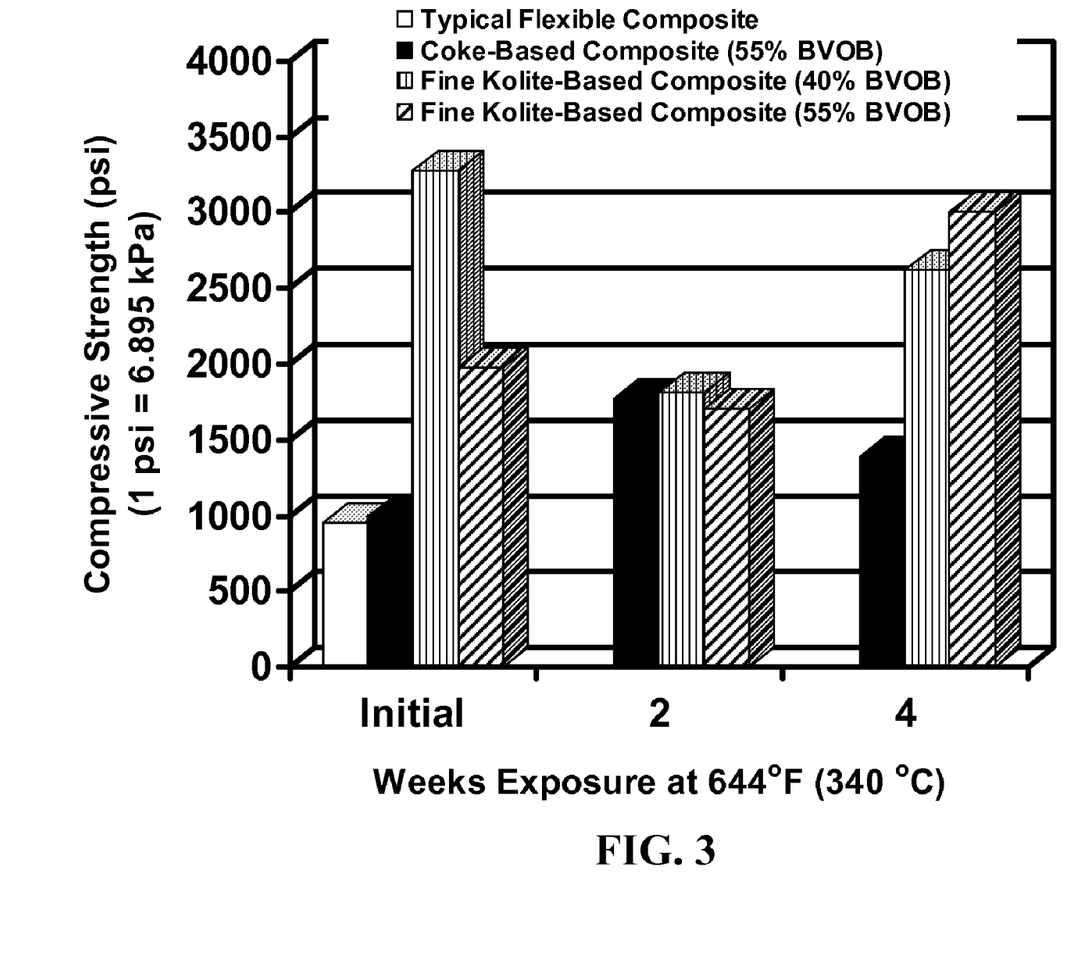
FIG. 3 shows the compressive strength (CS) vs. time for a typical flexible composite and for three flexible composites of the Invention.

From FIG. 3, it can be seen that a coke-based composite (55% BVOB) demonstrated approximately similar compressive strengths for initial samples (1000 psi (6.89 MPa)), samples cured for two weeks at 644° F. (340° C.) (1774 psi (12.23 MPa)), and samples cured for four weeks (1392 psi (9.60 MPa)). The cured samples had slightly higher compressive strengths than did the initial sample. One fine KOLITE™-based composite (55% BVOB) showed an increase between the initial samples (1980 psi (13.65 MPa)) and samples cured for four weeks at 644° F. (340° C.) (3003 psi (20.70 MPa)). The other (40% BVOB) showed a slight decrease. However, all the measurements on the initial and cured composites of the invention were higher than the initial value for the typical flexible cement composite. The initial 72 hour compressive strength for 12.9 ppg (1546 kg/m³) typical flexible composite was 954 psi (6.58 MPa). After a one-week exposure to 644° F. (340° C.), typical flexible composite samples were completely degraded, preventing any mechanical, porosity, or flow measurements from being made.

Tensile Strength

Figure 4:
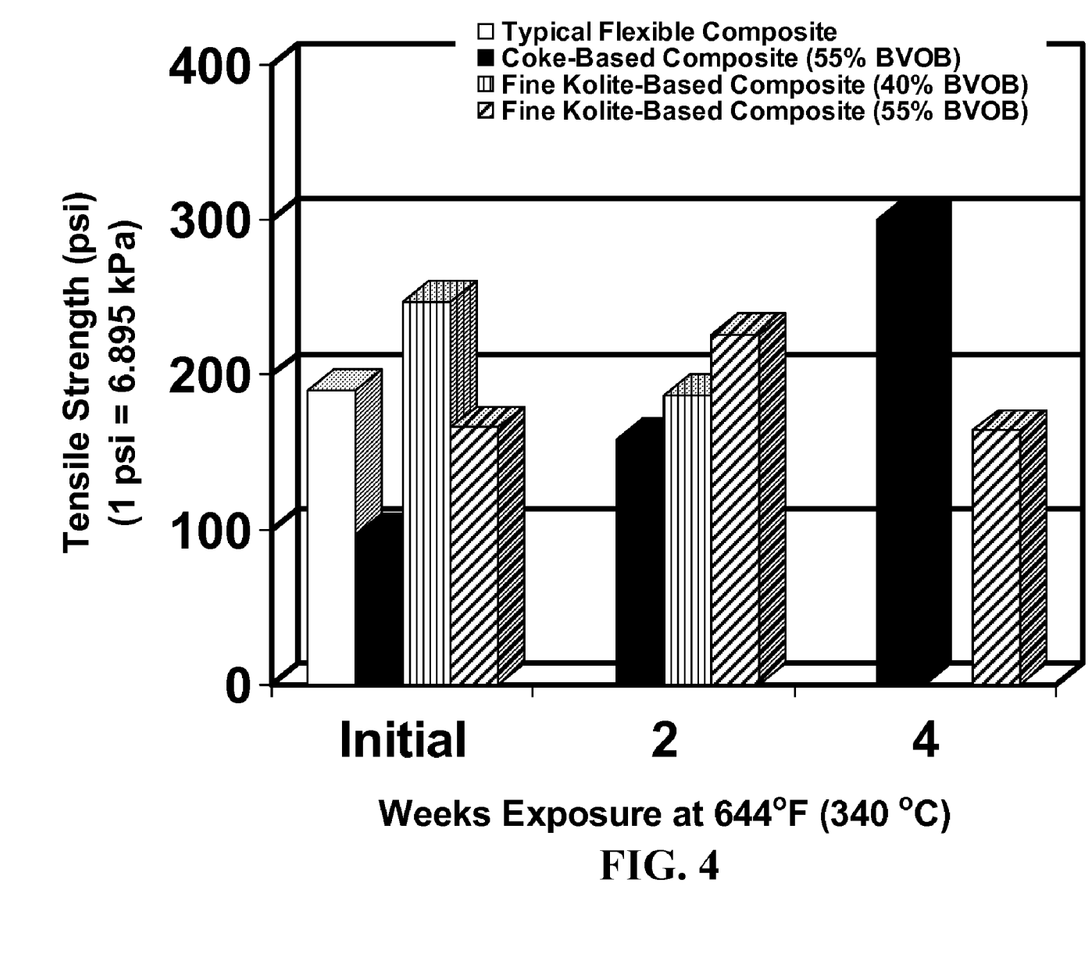
FIG. 4 shows the tensile strength (TS) vs. time for a typical flexible composite and for three flexible composites of the Invention.

The coke-based and fine KOLITE™-based composites of the Invention had tensile strengths measured throughout the four-week study that were generally about 10% of the compressive strengths of the same materials measured at the same conditions. This is typical of other flexible cement composites. The tensile strength results are summarized in FIG. 4

In previous downhole stress simulations of steam injection wells, the most stable systems have contained a combination of improved flexibility and strong tensile strength properties. In other words, a system with very high flexibility but weak tensile properties may still fail under certain conditions. The right combination of flexibility and tensile strength are essential in a long-term zonal isolation strategy. This Invention imparts the right combination of flexible and tensile properties to be successful under a wide and demanding range of steam injection environments.

Example 3

Porosity, Permeability, and Solubility at Elevated Temperature (644° F. (340° C.))

Porosity and Permeability

Figure 5:
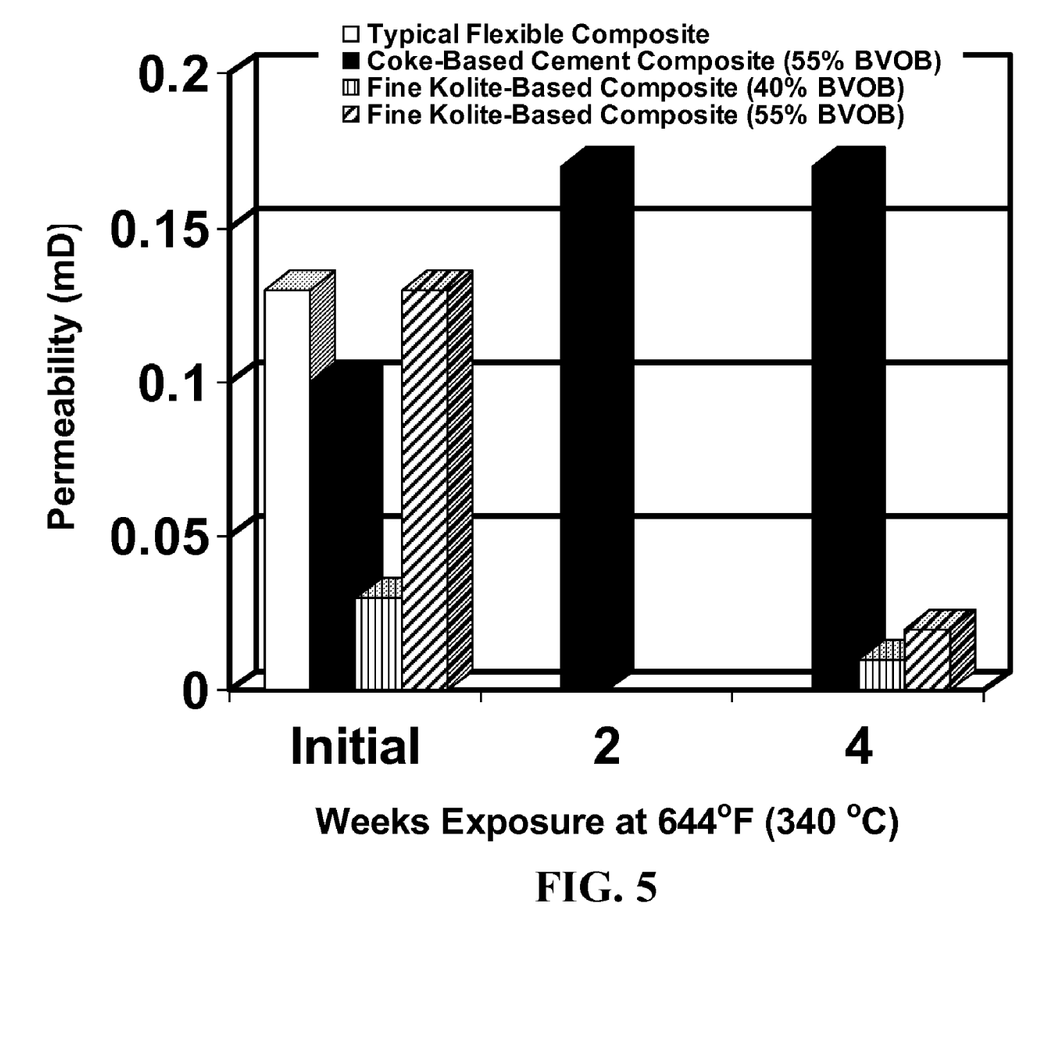
FIG. 5 shows the permeability vs. time for a typical flexible composite and for three flexible composites of the Invention.

Initial measurements indicated low porosity and permeability for coke, fine KOLITE™, and typical flexible cement composites. Laboratory measurements noted that the permeability of coke and fine KOLITE™-based composites remained approximately constant (less than about 0.2 and 0.02 mD, respectively) even after four weeks exposure at 644° F. (340° C.). Initial typical flexible composite permeability was low (~0.02 mD) but the samples were completely degraded and unsuitable for measurement after one week exposure at 644° F. (340° C.). Permeability results are summarized in FIG. 5.

Solubility in Liquid Hydrocarbon

After a one-week exposure at 644° F. (340° C.), two coke-based cement composite cores were placed in red diesel and allowed to sit at ambient conditions for one week. It could be seen that there was no degradation in the cores after the one-week exposure.

The results of much of the testing are summarized in Table 2.

The typical flexible cement composite sample was completely degraded after one-week exposure at 600° F. (316° C.), making mechanical, porosity, and permeability measurements impossible. Coke and fine KOLITE™ samples demonstrated acceptable mechanical and physical properties after sustained exposure to 644° F. (340° C.) for up to four weeks.

Example 4

Properties of Cement Extended with Fine KOLITE™ Compared to Properties of Cement with Conventional Extender at Ambient Temperature A low-density (13.1 ppg (1569 kg/m$^3$)) cement slurry formulated for use at low temperatures was prepared for comparative purposes, with 22% BWOB silica, and 22% BWOB polypropylene copolymer extender. The cement was API Class G A low-density (13.3 ppg (1593 kg/m$^3$)) cement of the Invention was prepared with the same cement, 18% BWOB silica and 40% BWOB fine KOLITE™ as the extender. A number of other additives typically found in oilfield cements were used in the formulations; they successfully performed the expected functions in the cement of the Invention. A number of properties of these two materials were compared. The cement of the Invention was slightly more viscous; the gel strengths of the two were similar; the free fluid was zero for each after 2 hours; the fluid loss (API RP 10B-2) results of the two were comparable; thickening times were similar; the setting time was faster for the cement of the Invention; the 48 hr ultrasonic compressive strength of the cement of the Invention was slightly lower (1050 psi (7239 kPa) vs. 1228 psi (8467 kPa) but still suitable; and sedimentation testing, after curing at 3000 psi (20,684 kPa) showed that the cement of the Invention was stable, with minimal sedimentation.

TABLE 2

| Property | Typical Flexible Cement Composite | Coke-Based Flexible Cement Composite | Fine KOLITE ™-Based Flexible Cement Composites | |
|---|---|---|---|---|
| Initial System Properties | | | | |
| Density ppg (kg/m$^3$) | 12.9 (1545) | 14.4 (1726) | 13.4 (1606) | 14.6 (1749) |
| SVF (%) | 57 | | 55 | |
| BHST | | 130° F. (54° C.) | | |
| BHCT | | 100° F. (38° C.) | | |
| Initial CS before curing | 954 psi (6.58 MPa) | 1000 psi (6.89 MPa) | 1980 psi (13.7 MPa) | 3282 psi (22.6 MPa) |
| Slurry Properties | | | | |
| California Class G (% BVOB) | 31.5 | 30.3 | 32 | 42 |
| Fine Silica (% BVOB) | 13.5 | 14.7 | 13 | 18 |
| Coke (% BVOB) Spec. Grav. = 1.4 Mean particle Size (microns) = 102.5 | — | 55 | — | |
| Fine KOLITE ™ (% BVOB) Spec. Grav. = 1.36 Mean Particle Size (microns) = 145.8 | — | — | 55 | 40 |
| Flexible Additive (% BVOB) | 55 | — | — | — |

Having thus described our Invention, We claim:

1. A cement comprising from about 20 to about 100% by weight of cement of finely ground sponge coke present in a particle size range of from about 1 to about 1000 microns and silica in an amount of from about 13 to about 45% by weight of blend.

2. The cement of claim 1 wherein the coke is derived from coal.

3. The cement of claim 1 wherein the coke is derived from a hydrocarbon liquid.

4. The cement of claim 3 wherein the hydrocarbon liquid is selected from petroleum, heavy oil, oil from tar sands, oil from oil shale, and oil from oil sands.

5. The cement of claim 3 wherein the coke is prepared by continuous fluid bed coking.

6. The cement of claim 3 wherein the coke is prepared by delayed coking.

7. The cement of claim 1 wherein the additive is present in a particle size range of from about 100 to about 200 microns.

8. The cement of claim 1 wherein the additive is not calcined.

9. The cement of claim 1 wherein the additive is present in an amount up to about 100 percent by weight of cement.

10. The cement of claim 9 wherein the additive is present in an amount of from about 20 to about 100 percent by weight of cement.

11. The cement of claim 1 further comprising one or more than one of a fluid loss additive and a retarder.

12. A method of cementing a cased well penetrating a subterranean formation comprising preparing a cement comprising from about 20 to about 100% by weight of cement of finely ground sponge coke being present in a particle size range of from about 1 to about 1000 microns and silica in an amount of from about 13 to about 45% by weight of blend, and injecting said cement into the annulus between the casing and the formation.

13. The method of claim 12 wherein the well is subsequently subjected to temperatures up to about 340° C.

14. The method of claim 12 wherein the cement is cooled to temperatures as low as −10° C.

15. A method of squeeze cementing a well penetrating a subterranean formation comprising preparing a cement comprising from about 20 to about 100% by weight of cement of finely ground sponge coke being present in a particle size range of from about 1 to about 1 000 microns and silica in an amount of from about 13 to about 45% by weight of blend, and injecting said cement into the well at a pressure sufficient to force the cement into a subterranean void.

16. A method for increasing temperature resistance of cement comprising adding from about 20 to about 100% by weight of cement of finely ground sponge coke in a particle size range of from about 1 to about 1000 microns and silica in an amount of from about 13 to about 45% by weight of blend to a cement composition wherein the composition containing the additive can be used to temperature up to 340° C.

* * * * *